Figure 1:
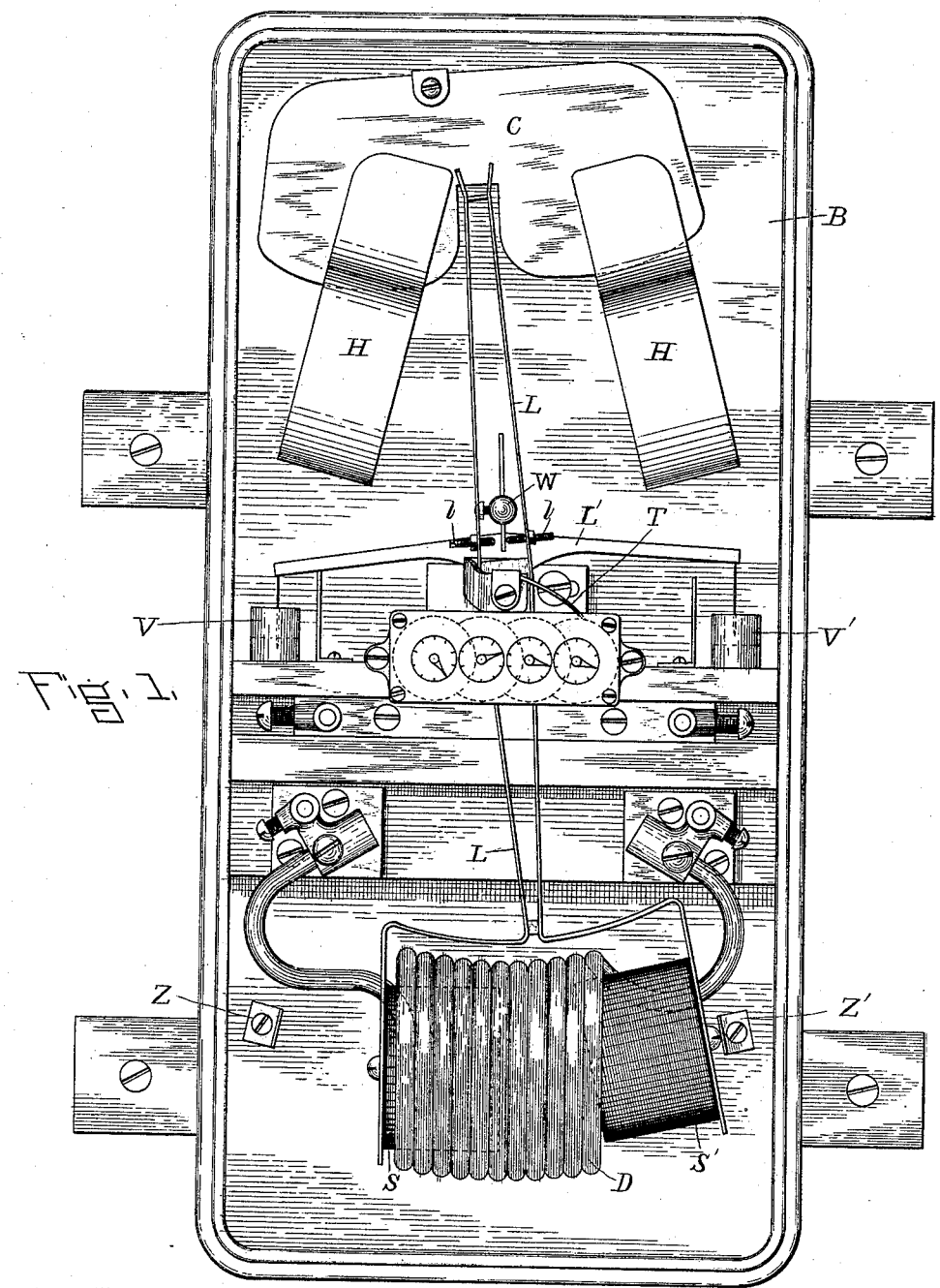

(No Model.) 6 Sheets—Sheet 1.

E. THOMSON.
ELECTRIC METER.

No. 432,654. Patented July 22, 1890.

WITNESSES:

INVENTOR
Elihu Thomson
BY
H. C. Townsend
ATTORNEY.

(No Model.) 6 Sheets—Sheet 2.
E. THOMSON.
ELECTRIC METER.
No. 432,654. Patented July 22, 1890.
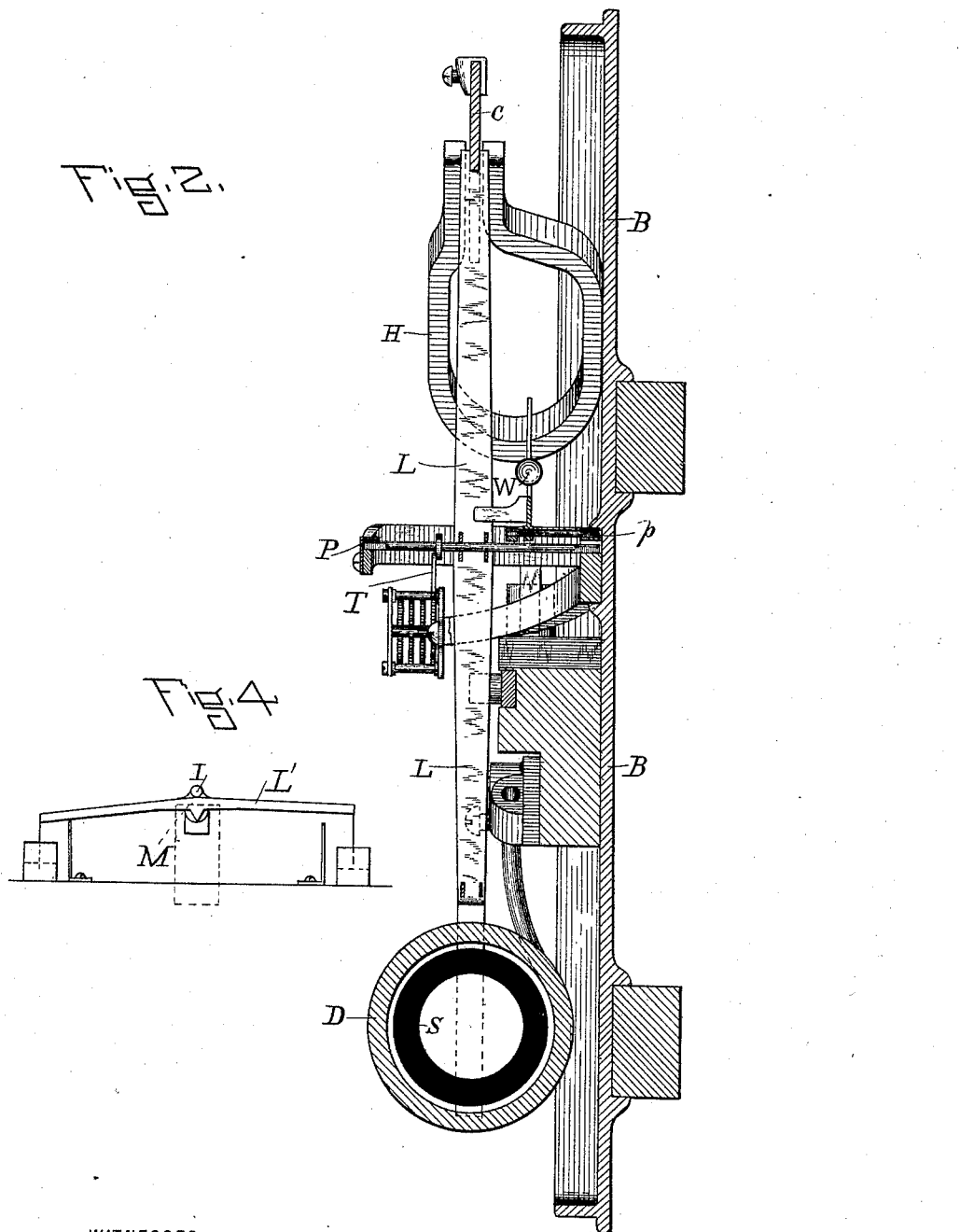
WITNESSES:
INVENTOR
Elihu Thomson
BY
ATTORNEY.

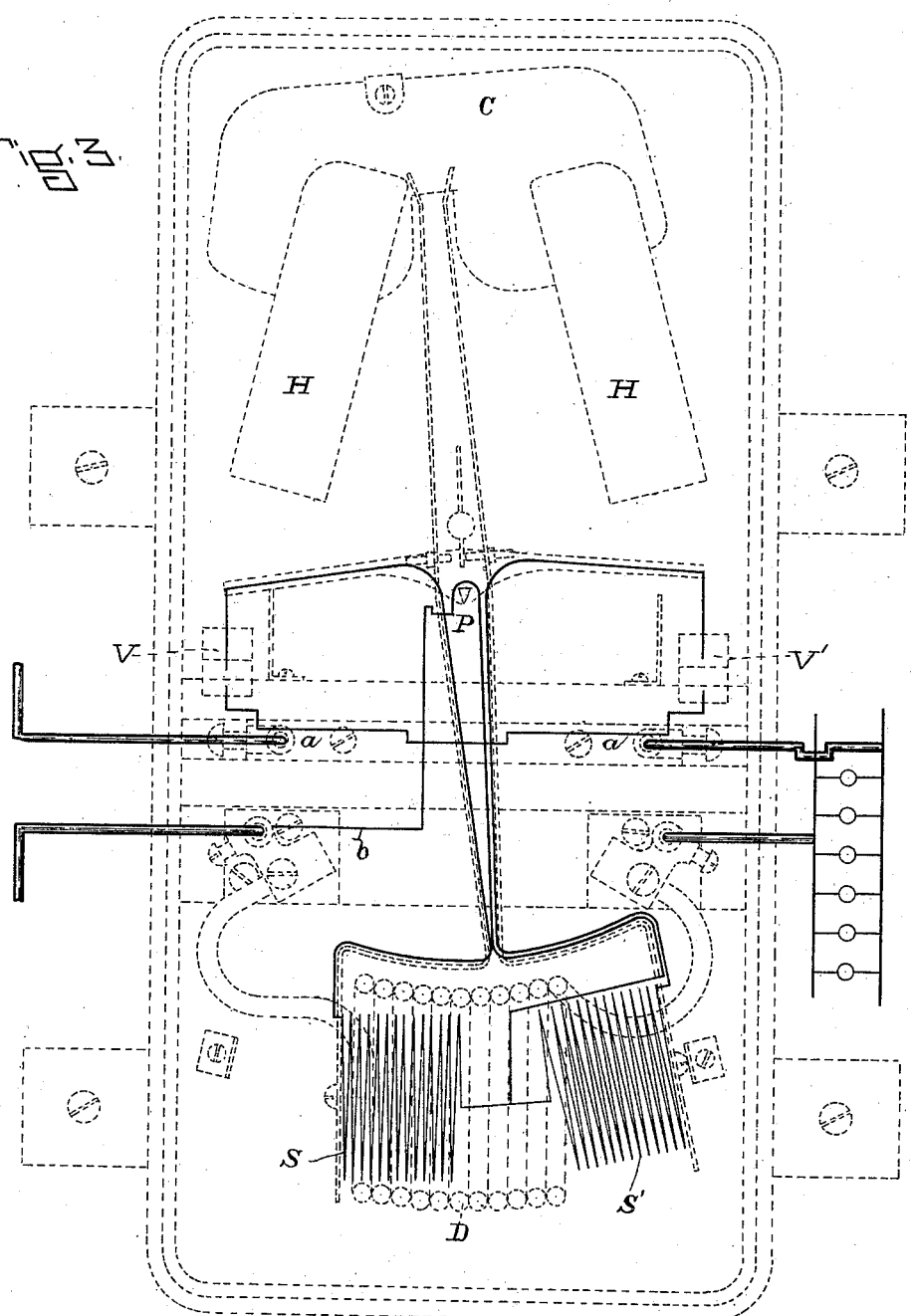

(No Model.)  
6 Sheets—Sheet 4.
E. THOMSON.
ELECTRIC METER.
No. 432,654.  
Patented July 22, 1890.
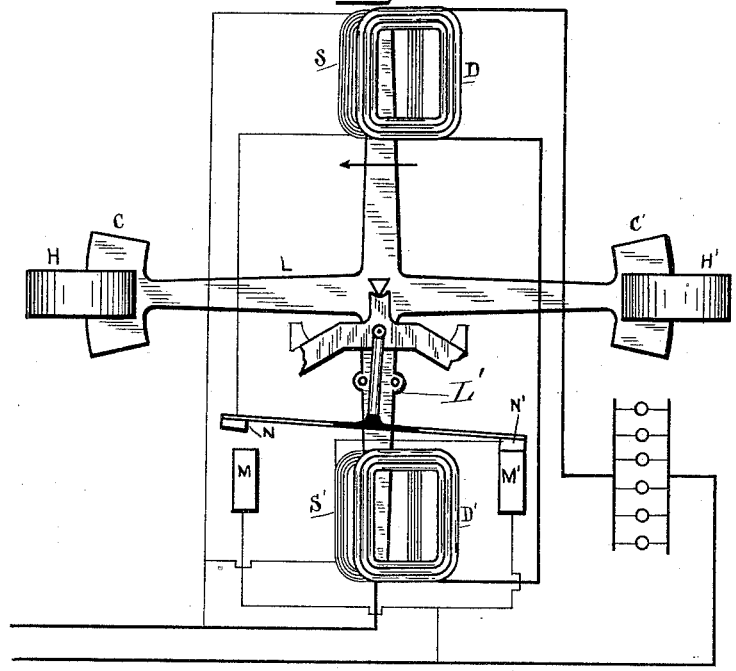
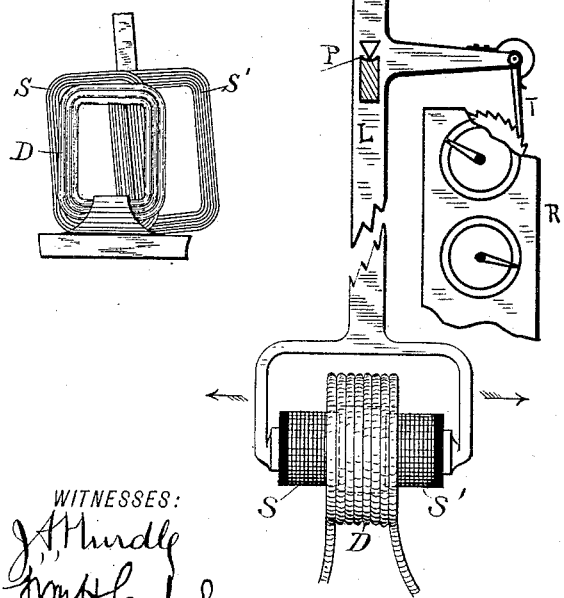
WITNESSES:  
J. A. Hindle  
Wm. H. Capel
INVENTOR  
Elihu Thomson  
BY  
H. C. Townsend  
ATTORNEY.
THE NORRIS PETERS CO., PHOTO-LITHO., WASHINGTON, D. C.

(No Model.) 6 Sheets—Sheet 5.

E. THOMSON.
ELECTRIC METER.

No. 432,654. Patented July 22, 1890.

WITNESSES:
J. A. Hurdle
Frank Capel

INVENTOR
Elihu Thomson
BY
H. C. Townsend
ATTORNEY.

THE NORRIS PETERS CO., PHOTO-LITHO., WASHINGTON, D. C.

(No Model.) 6 Sheets—Sheet 6.

E. THOMSON.
ELECTRIC METER.

No. 432,654. Patented July 22, 1890.

ATTEST:

INVENTOR:
Elihu Thomson
By H. C. Townsend
Attorney

UNITED STATES PATENT OFFICE.

ELIHU THOMSON, OF LYNN, MASSACHUSETTS.

ELECTRIC METER.

SPECIFICATION forming part of Letters Patent No. 432,654, dated July 22, 1890.

Application filed December 2, 1889. Serial No. 332,344. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

My invention relates to electric meters; and its object is to secure simplicity and effectiveness in the apparatus, as well as adaptability for operation with continuous or alternating currents.

A further object of the invention is to produce a meter which shall embody the principle, if desired, of an energy-meter.

My invention consists in the combination, with a pivoted or oscillating structure whose movements are registered, indicated, or recorded by any suitable mechanism, of an actuating or motive coil or circuit that carries current varying with the work or energy to be measured and a damping or retarding device connected with said oscillatory structure, and consisting, preferably, of a plate of copper or closed coil or conductor, and a magnet or other means for producing a magnetic field in which said copper plate or closed conductor may be shifted. Combined with the electric coil referred to is a suitable switch, circuit-controller, or commutator, which at each oscillation of the structure changes the connections of the motive devices, as will hereinafter be more fully described. The electric coil referred to may be made in one or more sections, and is preferably used, in connection with other coils related inductively to it or in moving relation to it, as an electro-dynamic coil. The circuit-changing or commutating devices might work to change the connections of the coil which carries the current to be measured, or, better, work upon the circuits of the coils inductively related to said coil. The various coils and devices described may be carried either by the oscillating structure or by a fixed support, as will be hereinafter described, and the circuit-changing devices may operate to make and break circuits or to reverse connections, so as to produce a motive influence on the oscillatory structure which shall be an action of repulsion alone, an action of attraction alone, or first repulsion and then attraction. I prefer to use repulsion of the coils, as it secures very good results in the simplest way. The coil or coils which carry a current varying with the work may be in direct circuit therewith or in a circuit inductively supplied from said work-circuit, and the separate coil or coils, or other devices which work electro-dynamically in connection with the first-named coil, may be either in an independent circuit entirely disconnected from the work-circuit and supplied by a separate source of energy, or may be inductively supplied from such circuit, or may be a branch of said work-circuit.

My invention consists, further, in the special organizations and combinations of parts and the special details of construction and manner of supplying the circuits of some of the coils, and in special cases keeping the current in them constant, to be hereinafter more fully described, and particularly specified in the claims.

Figure 9:
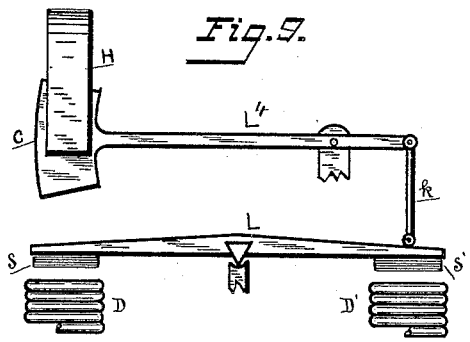
Figure 10:
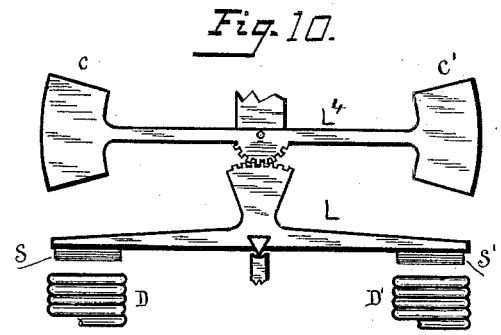
Figure 11:
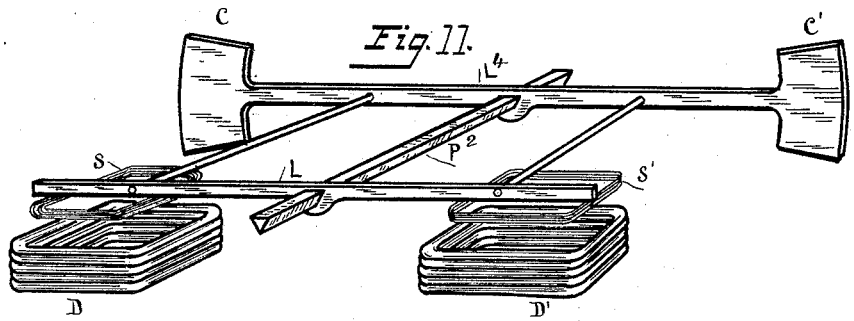
Figure 12:
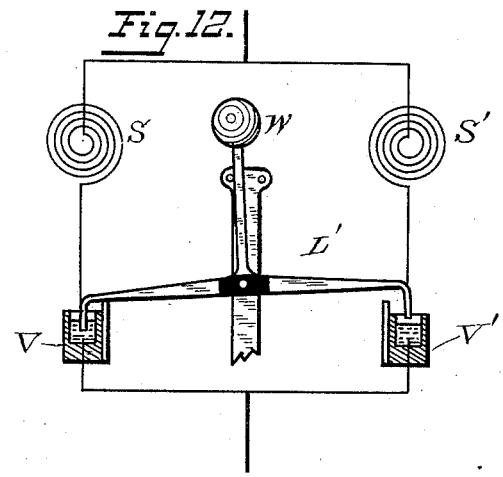
Figure 13:
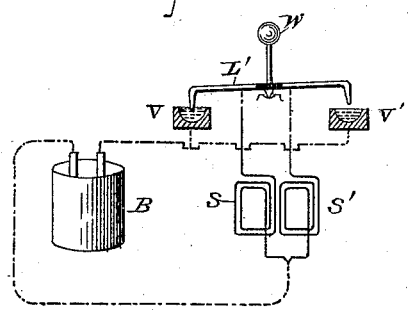
Figure 14:
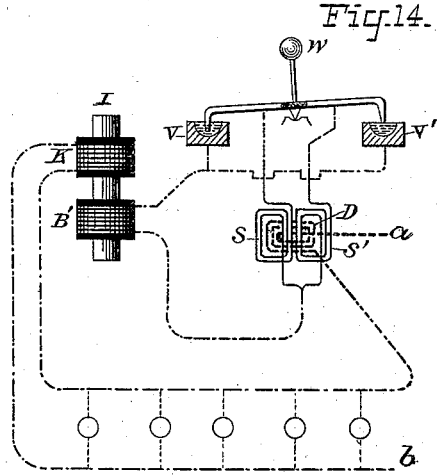
Figure 15:
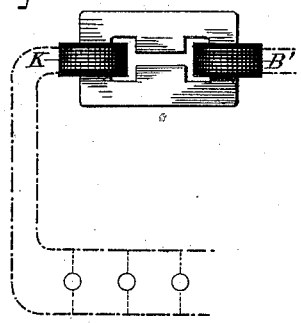
Figure 16:
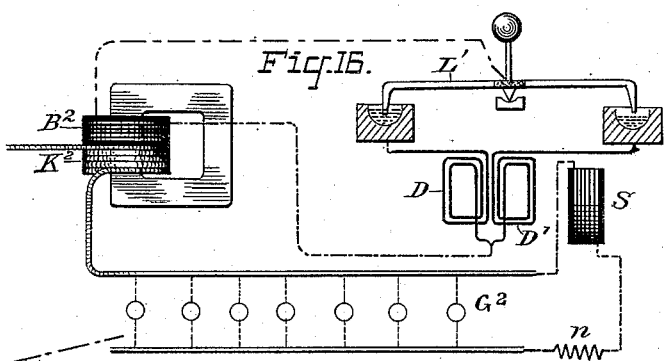
Figure 17:
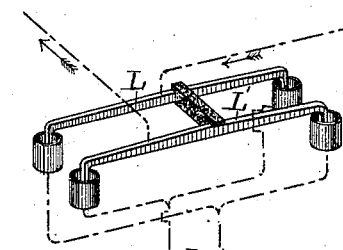
Figure 18:
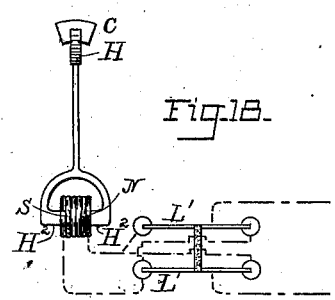

In the accompanying drawings, Figure 1 is a front elevation of an organization embodying my invention. Fig. 2 is an edge or side view of the same, a part being shown in section. Fig. 3 shows in front elevation the circuit arrangements separately. Fig. 4 shows a modified switching device from that in Figs. 1, 2, and 3. Fig. 5 shows a modification in the arrangement of the actuating-coils which operate on the vibratory structure. Figs. 6, 7, and 8 illustrate modifications in the relative placing of the coils for keeping up the oscillation of the structure through the influence of the current flowing in the main coil or sections of coil. Figs. 9, 10, and 11 illustrate modifications in the construction of the oscillating parts of the apparatus. Fig. 12 shows in a diagrammatic way the switch devices as related to the coils S S'. Figs. 13 and 14 show modifications in which the coils working in connection with the main-circuit coil are placed in circuits disconnected entirely from the main or work circuit. Fig. 15 shows a device that may be used in connection with the separate coil-circuit, preserving a constancy of current in the same despite variations of resistance from heating. Fig. 16 shows a further modification in the circuits. Figs. 17 and 18 illustrate modifications in the arrangement of the switching devices and show how the direction of flow of current in the coils may be reversed.

Referring to Fig. 1, L indicates a pivoted lever or structure mounted on a suitable pivot or bearing at P and arranged to oscillate either in a vertical or a horizontal plane, or any other plane, as desired. The knife-edge pivots for the structure are mounted on a suitable frame and back plate B, as shown. D indicates a coil or section of coil of few turns of coarse wire, which is connected to and placed in the circuit in which current flows in amount varying with the electric energy consumed. Preferably it is placed in the direct or main circuit with the energy users—such as electric lamps or other devices supplied in multiple—so that the whole current is caused to traverse the coil D. The coil D is the active coil, by whose action or by the action of current in which an oscillation of the lever or structure L is maintained with a rapidity dependent upon the amount of current so long as current passes. The intermittent or oscillatory action of the lever is kept up by a suitable switch device or commutator, and the motive influence is produced through an action of the electric current, and preferably by an electro-dynamic action of the coil D.

In the organization shown in Fig. 1, which is a preferable form of my invention, I employ, in connection with the coil D, which is fixed on a suitable base-plate B, two coils S S', placed as nearly as possible in the same axis as coil D and adapted to move into and out of the coil D or in the magnetic field of the same. The coils S S' are mounted on the lever L in any proper manner and swing from side to side under the repulsive influence of the coil D. When two separate coils S S' are used, as shown, the circuit controller or commutator, acting on the same, may be made to throw them alternately into circuit, though it would be entirely possible, though not to be preferred, as will hereinafter be apparent, to reverse the current in the coils and to keep them both in action at all times, each coil being made to operate alternately by repulsion and attraction. The coils S S' are in a circuit separate from D, and usually carry a constant current, for which purpose they may be placed in a branch passing from one to the other of the mains or leads supplying the translating devices in multiple, as when such mains or leads are of approximately constant potential. The coils S S', which are preferably of quite fine wire, may be connected into circuit and wound, so that they will be alternately repelled from the space inside the coil D or be attracted thereto, the former being the much preferred arrangement.

In the organization, Fig. 1, they are thrown alternately into circuit at or near the extremes of vibration of the structure L by means of a suitable circuit-controller or commutator. This controller or switch may be of any desired construction and operated by means of the lever L, directly or indirectly. A form suitable for the purpose consists of a lever L', pivoted so as to be capable of swinging independently of the lever L, and mounted, preferably, on an independent support, as shown at $p$, Fig. 2. The two ends of the lever L' or the contact-points at such ends are insulated from one another and are adapted to dip alternately into the mercury-cups V V' for the purpose of closing an electric circuit. The terminals of the coils S S', Figs. 1 and 3, are at one end joined together and connected through the pivot P and bearings or by other means with one terminal $b$ of the meter. The other terminals of S S' are carried separately to the two arms of the switch or commutator, as shown in Fig. 3. The mercury-cups V V' connect together and with the opposite terminal or other side of the circuit which is to be attached to post $a$ in the figures. In this case the connections of the coils S S' when in circuit through one or the other will be in shunt to the translating devices or the mains feeding such translating devices, the energy of which is to be measured or metered. It will appear that such connection may be modified in the construction of subsequent figures. The coils themselves may be made of sufficient resistance to check the current in this branch, or they may be in series when in circuit, with a specially-introduced resistance for the purpose of keeping down the current to as small an amount as will operate the mechanism. Movement is communicated to the switching or commutating devices by means of pins $l$ $l$, carried by lever L, and which engage with an extension from lever L'. W is an adjustable weight carried on a pin rising from the lever L'. These pins should be adjusted far enough apart so that each will engage with the lever L' and swing it over to change the circuit only after the lever L has nearly completed its movement from one extreme of vibration to the other extreme under the influence of the coil S or S' acted on by coil D or the current in it.

In the positions of the parts shown, if the action is a repulsive action only, the coil S is the coil in circuit. The repulsive action between D and S swings the lever L over toward its opposite extreme until, finally, just after the center of vibration in that direction is reached, the pin $l$ on such lever will engage with the lever L', or the extension therefrom, and swing it and the weight W over the center to the right, after which the weight W will complete the movement of the lever L' and change the connection to the mercury-cup V', thus throwing coil S' into circuit and the coil S out of circuit. The latter will now be in position to be acted upon by coil D, and a repulsion and movement or oscillation of the lever L in the opposite direction will now take place. Near the completion of the reverse movement just described the circuit-controller or commutator will be shifted by the other pin $l$ and the movement will be repeated. Thus a continued oscillation of this structure will take place so long as current exists in the coil or circuit D.

Z Z' are stops, preferably elastic, with which projections from the lever L engage to limit the oscillations of the structure. These stops are preferably made as springs, and will then operate to cause a little rebound to assist the reversal of movement or change from one phase of vibration to the other. The weight W has the effect to produce a sudden and positive movement of the switching or commutating devices at the instant when a change or reversal of the oscillation is to take place. Suitable stops limit the play of the switch L'.

In combination with the oscillating structure I employ a damping or retarding device, which is usually a magnetic damper, consisting of a plate of copper C or other good conductor, rather thick, or a closed band or circuit and a permanent magnet H or electromagnet or other device for producing a magnetic field, in which the copper plate shall be moved. In the organization shown in Fig. 1 the plate C is carried by the lever and the magnet H is stationary. It is obvious, however, that the magnet or other device producing the field might be carried by the structure and the plate be stationary. Again, both might be moved oppositely by a motion of the lever L. The effect of this device is to cause the structure to oscillate slowly and deliberately under the action of the movement-producing coils which carry the current to be measured. The magnet H should be rather powerful, so as to produce an intense field for the copper plate or closed conductor to move in. The effect of the plate is to consume or absorb the energy of oscillation imparted by the dynamic action of the coil D upon the coils S S' or other device.

A register or record of the oscillations of the structure may be kept in any desired manner. One way of keeping a registry (indicated in Fig. 1) consists in causing the lever L to operate on the pawl of a register-train, as shown, each oscillation moving such register. Other methods of registering the oscillations besides this purely mechanical method may of course be employed; but as these are at present well understood in the art I will not here describe them, but may mention that the circuit through either S or S' may contain an electro-magnetic device which on the completion of such circuit operates the pawl indirectly. The oscillations are best registered by means of a pawl T, carried by an arm or extension from the pivoted structure L, as indicated in Fig. 6. The means for registering, recording, or keeping tally of the number of oscillations of the structure form, however, no part of my present invention, which relates rather to the means for producing and maintaining the oscillatory movement in the proper manner.

The switching-lever L' might be arranged as shown in Fig. 4, having above its pivotal point a magnetic armature or piece of iron I opposite stationary magnetic surfaces M. The ends of the lever L' work in mercury-cups V V', as before, or other contact devices to shift the current are used, as before explained. Between the armature I and the magnet M is exerted an attraction, the action of which is to cause a sudden shifting of the lever L' when the armature passes over the pivotal point, or point of greatest distance from I to M. This device takes the place of the shiftable or oversetting weight W. The operation of the lever L' is produced by engagement of pins $l$, carried by lever L, with the lever L'. On movement in one direction the armature I approaches the magnet M, when circuit is closed at V, and this remains closed until again forcibly separated by the reverse movement, whereupon the lever L' suddenly shifts and, closing circuit at V', at the same time brings the armature I toward the magnet M on the side of the pivotal point opposite. The advantage of the magnetic device, Fig. 4, is that it will work without being leveled.

The details of switching or commutating devices may be indefinitely varied without departing from my invention, and it will be sufficient to use any circuit-controller or commutating device, such as is used with any oscillatory or vibrating structure moved by electric currents for the purpose of changing the circuits or electrical conditions at or near the terminations of each oscillation for the purpose of producing a continuance of the movement, but in a reverse direction.

It is not essential that two coils S S', Fig. 1, be placed together in line axially, as shown, as they might be separated, as shown in Fig. 5, one above and one below, the one on the end of one arm and the other on the end of another distinct arm of the oscillating structure L, which, as stated before, may be pivoted vertically or horizontally, or in other planes. In this case the direct current-coils D D' may be placed in two pairs and act on each coil S S', or there may be a single coil D or D' placed laterally alongside of the coils S S'. The action is to throw out, repel, or attract the coils S S', according to which is in circuit. The damping device may also be duplicated, as at C C', and the fixed magnets for acting thereon may be at H H'. It will be seen that the magnets H H' might be movable and the copper plate C C' might be fixed without changing the relations substantially.

Another arrangement of the coils D D' which I have found to be quite effective is illustrated in Figs. 7 and 8. In this case a double coarse wire coil D D', traversed by the current, as before explained, or in any of the ways hereinafter explained, acts to repel from its center laterally the coils S S' alternately, Fig. 7, according to which is in circuit. The coils S S' are carried on the lower end of the pivoted structure L, as shown. The repulsion of one draws the other in between the coils D D′, and such movement of repulsion at or near the completion of oscillation of structure L is followed by the switching of the current by the commutator or switch-lever, so as to produce an action of the coils D D′ upon the other coil S, and a reversal of the movement through the repulsion of such latter coil.

As before stated, I may depend upon either attraction or repulsion, and instead of using two coils S S′, I may in such case use a single coil under the influence of the coil D. Such a modification is indicated in Fig. 17. Here the commutating device consists of two levers L L′, each having the two mercury cups connected, as shown, to the terminals of the coil S, and adapted to reverse the circuit through the same, as well understood in the art. The device shown is typical of any commutator working to reverse a circuit. In this instance the current flowing in one direction through the coil S produces attraction between D and S, tending to oscillate the lever L in one direction. At the completion of the movement of L the commutator is shifted, as before described, thus reversing the connections of S and producing repulsion. This arrangement is, however, not to be preferred, as it duplicates the switching devices.

By using the reversing-commutator for the oscillating structure a single electric coil D, with direct currents, might be employed, as indicated in Fig. 18, where, in the place of the coils S S′, Fig. 6, I have shown two permanent magnets $H^2$ $H^2$, one having its north and the other its south pole arranged to enter the axis of the coil D. The magnets are carried by the oscillating structure, as before, and the coil D has its connections carried to the reversing-commutator.

In all of the preceding arrangements, and in the arrangements to be presently described, it is obvious that the electro-dynamic coil D might be either on the oscillating structure or on a fixed support, as desired, the part upon which it acts inductively being suitably placed with relation to it.

In the modified construction shown in Fig. 9 the damping device is connected to the oscillating structure L by means of a link K, which connects L to a second lever $L^4$, carrying the copper plate C. The connection might be through a segmental rack, as indicated in Fig. 10. The coils in this case, instead of moving in and out of one another, move to and from one another simply in the direction of the magnetic axis, otherwise the organization and operation of such an apparatus when combined with the proper switching devices or commutators would not differ from that of Fig. 1. The arrangement, Figs. 9 and 10, is not so desirable, however, as the range of movement of the parts while in inductive relation to one another is comparatively limited.

In the modification shown in Fig. 11 the rock-bar $P^2$ carries two separate levers L $L^4$, directly attached to it, one lever carrying the coils S S′, or equivalent part of the structure, and the other two copper plates C C′. When the coil or coils D D′ are made to operate electro-dynamically on the coil or coils S S′, it is not necessary that the latter coils should be in a connection from a circuit carrying the current to be measured, although when the potential across the two sides of such circuit is fairly constant it is desirable to so energize them. As indicated in Fig. 13, however, they might be fed by connection with a separate source of energy—such as a galvanic battery B—provided such source of energy is fairly constant in strength. This is a modification which may be employed when the currents are continuous currents. The arrangement before described, however, should be employed in the case of alternating currents. The battery-current might replace the branch connection when the object of the meter is to register current irrespective of potential.

When the potential of the mains is very high, or where it is desirable to vary the proportion of energy delivered to the coils S S′, I prefer to employ an arrangement such as shown in Fig. 14, in which I have shown a transformer whose primary K is connected in derivation across the mains $a\,b$, while its secondary B′ supplies the circuit of the coils S S′. By moving the core I of the transformer, or by otherwise adjusting the potential that shall be set up in the secondary, the proportion of current in the coils S S′ may be adjusted.

In some cases there may be a liability to derangement of action of the meter from variations of resistance in the circuit of the coils S S′, either from heating of the coils themselves or by changes of resistance at the contacts of the switch or commutator or from other means. To avoid this difficulty, I propose to supply the coils S S′ with a current which is automatically regulated, so as to be constant in amount despite any changes of resistance in the circuit. Any means may be employed for this purpose; but for alternating circuits I prefer to use a constant-current transformer, such as indicated in Fig. 15, the primary K of which is connected to any suitable source—as, for instance, to the mains $a\,b$—while its secondary coil B′ connects with the circuit of the coils S or S′. By this means the current in the circuit of coils S S′ will be kept constant so long as constant potential is maintained in the coil K. The transformer shown is the same as that in my patent, No. 400,516, and any modifications of it might be employed.

The arrangement shown in Fig. 15 also permits the raising or lowering of the potential by changing the winding.

As before stated, it is not necessary that the coils D should be in the main circuit. Thus, as shown in Fig. 16, the coils D D′ are to be supplied from the secondary $B^2$ of a transformer, the primary $K^2$ of which should be in the main circuit. The fixed coil or coils of the meter S might be placed in a shunt to the mains. In this organization the coils D D' may be carried by the oscillating structure, and the coil S be fixed, or, vice versa, the coils might be carried by the structure and moved between the coils D D', but on a fixed support, suitable connection in either case being made from coils D D' or S with the switch device. By the arrangement shown in Fig. 16 any potential desired may be obtained in the secondary $B^2$—as, for instance, a potential which would increase with the load in $G^2$—coil S in the meantime being a constant average current-coil in shunt to the mains and with or without a resistance in circuit with it.

While I have described modifications of my invention in which coils S S' are dispensed with and the coil D acts electro-dynamically upon a permanent magnet or a piece of soft iron, I prefer to use two coils or sets of coils D S, inductively related, as before explained.

What I claim as my invention is—

1. In an electric meter, the combination, with a pivoted oscillating structure, of an electric coil or coils for oscillating the same, a circuit-controller or commutator, and a magnetic damper.

2. The combination, in an electric meter, of an oscillating or vibrating structure, two electric coils carried thereby, a circuit-controller for throwing said coils into circuit alternately as the structure vibrates, and a magnetic damper of the vibrations.

3. In an electric meter, the combination, with an oscillating structure, of two coils or circuits inductively related for actuating said structure, a circuit-controller or switching device for changing one of said circuits in accordance with the vibration of the structure, and a magnetic damper of the vibrations.

4. In an electric meter, the combination, with an oscillating structure, of two coils or circuits inductively related for actuating said structure, a switch or circuit-controller for changing one of said circuits in accordance with the vibrations of the structure, a magnetic damper of the vibrations, an oversetting-weight carried by the switch device, and pins or pallets on the structure for engaging with the said switch device.

5. In an electric meter, the combination of a pivoted oscillatory structure, electric coils carried thereby, fixed coils in inductive relation to the same, connections from said fixed coils to a circuit in which current varies with the work, and a commutator or switching device for changing the connection of one of the coils or sets of coils as the structure vibrates.

6. The combination, in an electric meter, of a pivoted oscillating structure, an electro-dynamic coil or coils inductively related to an attracted or repelled device on the pivoted structure, a commutator or circuit-changer for changing the connections of said coil or coils as the structure vibrates, and a magnetic damper of the vibrations.

7. The combination, in an electric meter, of an oscillating pivoted structure, fixed coils in a circuit in which current varies with the work, two coils carried by said structure in inductive relation to the first and in a separate circuit, and a circuit-changer for throwing said coils alternately into circuit as the structure oscillates, as and for the purpose described.

8. In an electric meter, the combination of the following elements: first, a coil or coils in the main circuit where current varies with the work; second, a coil or coils inductively related to the first and in a separate circuit, an oscillating structure upon which one of said elements is supported, a commutator or device for changing the connections of one of said elements as the structure vibrates, and a damper or retarder of the vibrations.

9. The combination, in an electric meter, of a vibrating or oscillatory structure, sets of actuating-coils, one carried by a fixed support, the other by said structure, and placed, respectively, in a circuit where current varies with the work and in a separate circuit, and a copper-plate disk or closed conductor in a magnetic field for damping the movement of said structure, as and for the purpose described.

10. The combination, in an electric meter, of a pivoted oscillating structure, two electro-dynamic coils or sets of coils for actuating the same one in a circuit whose current varies with the work, the other in an approximately constant-current circuit, and a circuit-changer for changing the action of one of said coils or sets of coils at each vibration of the structure, as and for the purpose described.

11. The combination, in an electric meter, of a pivoted oscillating structure, two electro-dynamic coils or sets of coils for actuating the same, one in a circuit whose current varies with the work, the other in an approximately constant-current circuit, a switch device or commutator for changing the action of one of said coils at each vibration of the structure, and a copper plate acting as a damper or retarder for the oscillating structure.

12. The combination, in an electric meter, of two electro-dynamic coils or sets of coils, one carrying current varying with the work, a transformer adapted to supply an approximately constant current despite changes of resistance on the circuit of its secondary, and a secondary circuit which includes the other electro-dynamic coil.

13. The combination, in an electric meter, of two actuating electric coils or circuits, one carrying current varying with the work, a transformer or induction-coil whose secondary feeds the other coil or circuit, and a switching device or commutator in the latter circuit.

14. The combination, in an electric meter, of two electro-dynamic coils movable with relation to one another under the influence of the currents circulating at the same time in both of them, a circuit wherein the current varies with the work, including one of such coils, and an adjustable induction-coil or transformer, the primary of which is connected to the working-circuit while its secondary circuit includes the other coil, as and for the purpose described.

15. The combination, in an electric meter, of a pivoted oscillating structure, electro-dynamic coils or sets of coils fixed and movable, one in the main circuit with the work the other in a derived circuit, and a copper plate and magnet, one carried by the structure for retarding its oscillations under the dynamic effects of the coils, as and for the purpose described.

16. The combination, in an electric meter, of an oscillating or vibratory structure, two coils or sets of coils arranged to react mechanically, one coil or set of coils being fixed and the other mounted on the structure so as to swing in a position in front of or past the other coil, connections from one coil or set of coils to a circuit in which current varies with the consumption of energy to be measured, a switch, circuit-controller or commutator in the circuit of the other of said coils for changing the connections and producing continued oscillation of the structure, and a copper plate for damping the oscillations of said structure.

17. The combination, in an electric meter, of coils or sets of coils in moving relation one to the other and placed, respectively, in the main and in a branch circuit, or their equivalent, as described, and a copper plate and magnet for absorbing the dynamic energy of the coils carried upon the structure whose movements are registered to form a record of the current consumed.

Signed at Lynn, in the county of Essex and State of Massachusetts, this 20th day of November, A. D. 1889.

ELIHU THOMSON.

Witnesses:
JOHN W. GIBBONEY,
DUGALD McKILLOP.